United States Patent
Roeder et al.

(10) Patent No.: US 9,501,223 B2
(45) Date of Patent: Nov. 22, 2016

(54) METHOD FOR TRANSMITTING EXTENDED COMMANDS TO A MEMORY SYSTEM

(71) Applicant: HYPERSTONE GMBH, Constance (DE)

(72) Inventors: Martin Roeder, Constance (DE); Martin Preiser, Constance (DE)

(73) Assignee: Hyperstone GmbH, Constance (DE)

( * ) Notice: Subject to any disclaimer, the term of this patent is extended or adjusted under 35 U.S.C. 154(b) by 236 days.

(21) Appl. No.: 14/318,905

(22) Filed: Jun. 30, 2014

(65) Prior Publication Data
US 2015/0378608 A1    Dec. 31, 2015

(51) Int. Cl.
*G06F 12/00*    (2006.01)
*G06F 3/06*    (2006.01)

(52) U.S. Cl.
CPC ........... *G06F 3/0604* (2013.01); *G06F 3/0659* (2013.01); *G06F 3/0679* (2013.01)

(58) Field of Classification Search
CPC ... G06F 3/0604; G06F 3/0659; G06F 3/0673
See application file for complete search history.

(56) References Cited

U.S. PATENT DOCUMENTS

| 7,334,077 B2 | 2/2008 | Nassar |
| 7,779,033 B2 | 8/2010 | Winzenried |
| 2010/0115200 A1 | 5/2010 | Papagrigoriou |

FOREIGN PATENT DOCUMENTS

| DE | 112007000101 T5 | 12/2008 |
| EP | 1702250 A2 | 9/2006 |

*Primary Examiner* — Yong Choe
(74) *Attorney, Agent, or Firm* — Laurence A. Greenberg; Werner H. Stemer; Ralph E. Locher

(57) ABSTRACT

Extended commands are transmitted from computer system via a standard interface to a memory system. The computer system accesses logical memory addresses via an application interface using standard read/write commands which are processed by a memory controller in the memory system. A sequence of read commands for at least two logical memory addresses with address values that differ in at least one bit are output by the computer system. The memory controller compares the sequence of different bits with a predefined bit sequence, the magical address sequence. In the event of a match, a subsequent write command for one of the logical memory addresses is used to open a management connection between the computer system and the memory controller, and the useful data contained in the write command are evaluated by the memory controller and are not written to the addressed memory address.

10 Claims, 1 Drawing Sheet

METHOD FOR TRANSMITTING EXTENDED COMMANDS TO A MEMORY SYSTEM

BACKGROUND OF THE INVENTION

Field of the Invention

The invention relates to a method for transmitting extended commands to a memory system which is connected to a computer system via a standard interface and with respect to which the computer system accesses logical memory addresses via an application interface using standardized write and read commands which are processed by a memory controller in the memory system.

A widespread example of such a configuration is the connection of SD memory cards (SecureDigital memory cards) to a PC via a USB interface which is implemented, in terms of hardware, via a controller with a "bridging function." Such a bridge controller provides a USB interface on the computer side and converts USB read and write commands into simple SD read and write commands. In this case, on account of the restrictive USB drivers, it is possible to use only a protocol which substantially consists of read and write commands for data which are combined in so-called fixed-length sectors, for example 512 bytes.

However, the generic SD card interface provides a very much more powerful command interface which, at first glance, could be used only by extending the driver functions. Examples of such commands are the vendor command CMD56 defined in the SD specification or the ASSD commands (Advanced Secure SD commands CMD34, CMD35, CMD36, CMD37, CMD54 and CMD57). This is virtually not possible at all in the multiplicity of different computer systems and associated operating systems to which memory systems can be connected.

Any desired functions can be freely assigned to the command CMD56, for example for determining statistical data relating to the hardware state of the memory, for initially installing the device firmware and much more. The ASSD commands allow various security systems to be implemented.

European patent EP 1702250 B1 describes a method in which the restrictions of the drivers are circumvented by the normal transmission of special files which contain the extended commands as useful data. One disadvantage of that method is that a dedicated area with special logical block addresses is reserved. However, operating systems often independently shift the storage location of a file and there may subsequently be identification problems during subsequent access.

In U.S. Pat. No. 7,334,077 B2, the problem of the restriction of the drivers is circumvented by transmitting a predetermined data sequence in a conventional writing block. A so-called memory window (memory location window) is therefore opened for the execution of special commands. This has the disadvantage that the predefined pattern of the predetermined data sequence must be looked for in the useful data for each write command by the device firmware or by hardware to be specifically developed for this purpose, which means considerable additional outlay during normal memory processing. However, the execution of extended commands can be considered to be a comparatively rare task in a data memory device.

The method proposed there also means that the extended commands are not transmitted in a transparent manner.

SUMMARY OF THE INVENTION

It is accordingly an object of the invention to provide a method for transmitting extended commands to a memory system which overcome the disadvantages of the heretofore-known devices of this general type and which provides for a method that allows functions of the memory system to be addressed using extended commands without having to intervene in existing drivers of the standard interfaces.

With the above and other objects in view there is provided, in accordance with the invention, a method of transmitting extended commands to a memory system connected to a computer system via a standard interface, wherein the computer system accesses logical memory addresses via an application interface using standardized write and read commands that are processed by a memory controller in the memory system. The method comprises the following steps:

outputting from the computer system via the application interface, a sequence of read commands for at least two logical memory addresses having respective address values that differ in at least one of their bits;

comparing with the memory controller the sequence of mutually different bits with a predefined bit sequence (the magical address sequence) to determine whether or not a match exists;

in the event of a match, using a subsequent write command for one of the logical memory addresses to open a management connection between the computer system and the memory controller; and evaluating the useful data contained in the write command by the memory controller and not writing the useful data to the addressed memory address.

In other words, the method for transmitting extended commands to a memory system relates to configurations in which the memory system is connected to a computer system via a standard interface. In this case, the computer system accesses logical memory addresses via an application interface using standardized write and read commands which are processed by a memory controller in the memory system.

The method is distinguished by the fact that the computer system outputs, via the application interface, a sequence of read commands for two logical memory addresses, the address values of which differ in at least one of their bits. The memory controller compares the sequence of different bits of the address values with a predefined bit sequence, the magical address sequence.

In the event of a match between the bits which have been read and the magical address sequence, a subsequent write command for one of the logical memory addresses is used to open a management connection between the computer system and the memory controller, in which case the useful data contained in the write command are evaluated by the memory controller and are not written to the addressed memory address.

Such a method is used to change a memory device to a temporary state with a management connection using standard commands which do not result in any undesirable change to the memory, in which state data which are transmitted in the subsequent write or read commands are understood as being an extension of the command set of the memory system (extended commands) or contain commands which, although belonging to the command set of the system, otherwise would not be able to be transmitted via the standardized interface.

The commands transmitted via the interface during the management connection behave like normal write/read commands and virtually do not affect the course of normal memory operation.

Such commands may comprise, for example, emulated SD vendor commands which are used to read status information relating to the device. In a flash memory for example, this information may be wear information which gives an indication of the need to replace the device soon, or functions may be initiated which ensure the data integrity of the data stored in the memory system.

In order to change from normal memory operation to the "management connection" status, a particular but freely selectable sequence of read addresses is predefined.

The firmware in the memory controller of the memory system monitors read commands for LBA sequences which consist of at least two LBA values $x_i$, (i=1, ..., n, n≥2). In this case, the values $x_i$ are freely selectable addresses which must be inside the address space of the memory system since they would otherwise not be forwarded by any computer system to the memory system. The least significant address bits (LSBs) of all observed LBAs in such a sequence are compared with a random but fixed bit sequence having a length of n, the magical address sequence. The checking of the address sequence is restarted after any discrepancy (incorrect LSB or LBA not in $\{x_i, i=1, ..., n, n≥2\}$). The values of $x_i$ for i=k and i=l, where k, 1≤n, k≠l, do not all need to be different; it is sufficient if at least two different values are assumed. In this case, a preferred implementation is where two adjacent LBA values, x and x+1, are used. This reduces the likelihood of incorrect detection.

If the complete magical address sequence has been found, a subsequent write command for one of the LBAs $x_i$ is used to "open" the management connection. In this case, the useful data transmitted in associated data sectors are used as parameters. These useful data are not written to the memory of the memory system.

In one exemplary implementation, these data sectors may contain the following as useful data:
  the command code to be emulated or the code of an extended command;
  the argument of the command to be emulated/extended command.

Instead of only a single emulated or extended command, a list of a plurality of commands with their arguments, which are then processed in succession, may also be stated in the data area.

The management connection is explicitly closed by transmitting a "close connection" command instead of the command code to be emulated.

The length of the magical address sequence should not be selected to be too small, for example 128 bits, in order to minimize the risk of incorrect detection.

An abbreviated example of the case of two adjacent LBA values x and x+1: the magical address sequence 0101100010101 is complied with by the LBA sequence 2, 3, 2, 3, 3, 2, 2, 2, 3, 2, 3, 2, 3 and also by the LBA sequence 1016, 1015, 1016, 1015, 1015, 1016, 1016, 1016, 1015, 1016, 1015, 1016, 1015.

The selected bit position need not be the least significant bit of an address, but rather a bit at any desired position may in principle be taken for comparison. Instead of a single bit, it is also possible to use a group of bits, for example four, for comparison.

In addition to commands which, although having a standard equivalent, are not accessible via the simple protocol (emulated commands, for example ASSD commands), it is likewise possible to transmit and execute extended commands which do not exist at all in the underlying standard (for example the SD specification). Such commands can be used to operate an additional microcontroller which is connected to the memory controller via an IO interface. The microcontroller can undertake various tasks, for example a payment function via NFC or encryption functions.

Other features which are considered as characteristic for the invention are set forth in the appended claims.

Although the invention is illustrated and described herein as embodied in method for transmitting extended commands to a memory system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
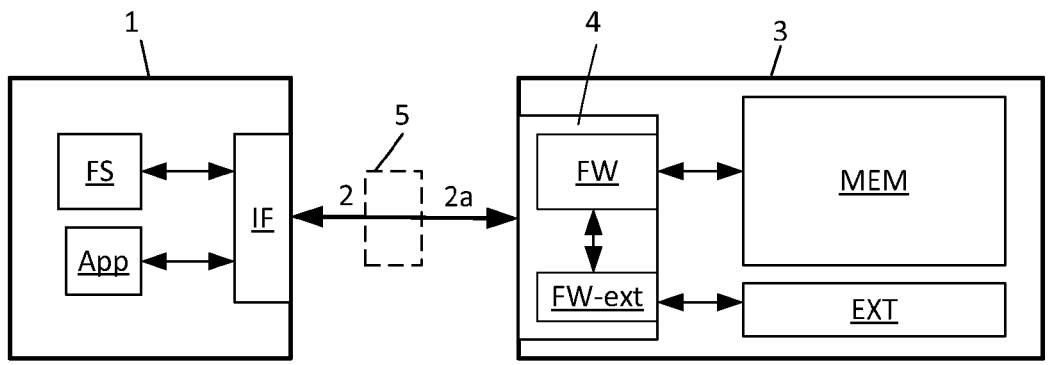
FIG. 1 is a diagram of the configuration of a memory system connected to a computer system.

Referring now to the figures of the drawing in detail and first, particularly, to FIG. 1 thereof, there is shown a computer system 1 on which a normal file system FS and an application APP for a management connection are installed. Both use the standardized interface 2 via the standardized driver IF for the interface 2. An interface adapter 5 is possibly inserted in the interface connection and adapts the interface 2 to the altered interface 2a. The interface 2 may be a USB interface which is adapted to an SD card interface via the interface adapter 5.

A memory controller 4 which uses the interface 2 or 2a is situated in the memory system 3. This is first of all effected via the firmware FW which evaluates normal storage commands of the computer system 1 and carries out the storage operations on the memory MEM. The memory MEM is typically a non-volatile flash memory.

The firmware FW also checks the incoming read commands for the magical address sequence. As soon as the latter has been detected, the management connection between the application APP and the firmware for additional functions FW-ext is opened. Subsequent write/read commands from the application APP are evaluated and processed by the firmware for the additional functions FW-ext or are possibly forwarded to a microcontroller for additional functions EXT.

The management connection is maintained until the "close the management connection" command is detected.

Figure 2:
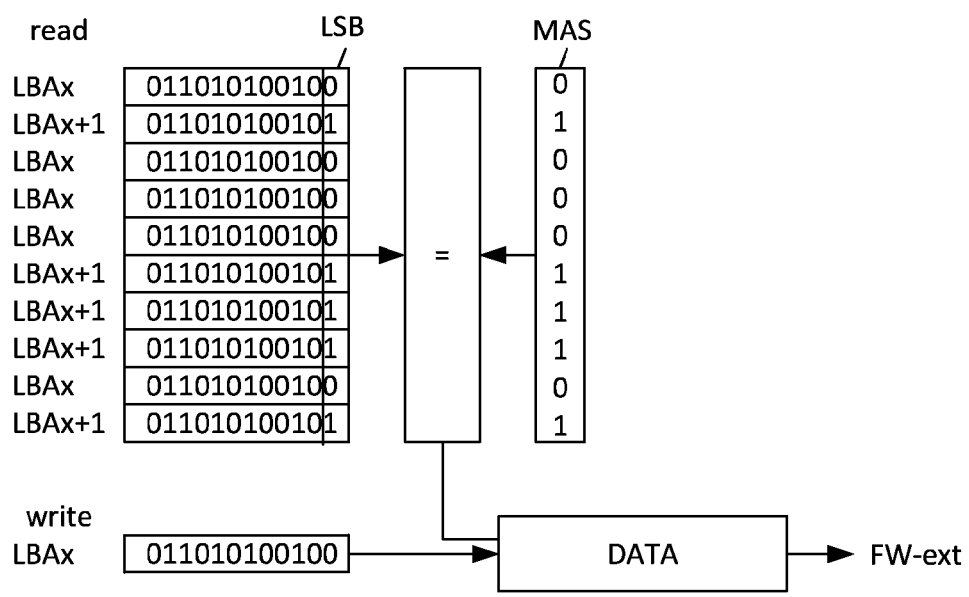
FIG. 2 shows the comparison of the logical addresses used with the magical address sequence.

FIG. 2 schematically illustrates the comparison process for detecting the magical address sequence MAS. The application outputs a sequence of "read" commands for the logical block addresses LBAx and LBAy, where y=x+1 here, and the least significant bit LSB is therefore different. Abbreviated 12-bit addresses are shown by way of example here, in which case the address of LBAx has a LSB=0 and the address LBAx+1 has a LSB=1. The detected sequence of least significant bits LSB is compared with the magical address sequence MAS, here "0100011101." If a match is detected, the data DATA in the subsequent "write" command are forwarded to the firmware for the additional functions FW-ext and are evaluated there.

The following is a summary list of reference numerals and element acronyms and abbreviations, and the corresponding structure used in the above description of the invention:

1 Computer system
2 Standardized interface
2a Altered interface
3 Memory system
4 Memory controller
5 Interface adapter
APP Application for the management connection
DATA Useful data
EXT Microcontroller for additional functions
FS File system
FW Firmware for memory operation
FW-ext Firmware for the additional functions
IF Driver for the standardized interface
LBA Logical block address
LSB Least significant bit
MAS Magical address sequence
MEM Memory
x, y, $x_i$ Logical memory addresses
n Length of the magical address sequence.

The invention claimed is:

1. A method of transmitting extended commands to a memory system connected to a computer system via a standard interface, wherein the computer system accesses logical memory addresses via an application interface using standardized write and read commands that are processed by a memory controller in the memory system, the method comprising the following steps:

outputting from the computer system via the application interface, a sequence of read commands for at least two logical memory addresses having respective address values that differ in at least one of their bits;

comparing with the memory controller the sequence of mutually different bits with a predefined bit sequence to determine whether or not a match exists;

in the event of a match, using a subsequent write command for one of the logical memory addresses to open a management connection between the computer system and the memory controller; and evaluating the data contained in the write command by the memory controller and not writing the data to the addressed memory address.

2. The method according to claim 1, which comprises evaluating only a least significant bit of the addressed memory addresses.

3. The method according to claim 1, which comprises using two adjacent logical memory addresses.

4. The method according to claim 1, wherein the predefined bit sequence is a magical address sequence having a length greater than or equal to 128 bits.

5. The method according to claim 1, which comprises restarting the comparing step if the bit sequence differs from the magical address sequence.

6. The method according to claim 1, wherein the data contain a code of an emulated or extended command.

7. The method according to claim 6, wherein the data contain arguments of the emulated or extended command.

8. The method according to claim 6, wherein the data contain codes and/or arguments of a plurality of commands.

9. The method according to claim 1, wherein the data contain a code for closing a management connection.

10. The method according to claim 1, which comprises using the extended commands to operate an additional microcontroller connected to the memory controller.

* * * * *